US012526576B2

(12) United States Patent
Darr

(10) Patent No.: US 12,526,576 B2
(45) Date of Patent: Jan. 13, 2026

(54) SCALED RESIDUAL FUNDAMENTAL BASS ENHANCEMENT

(71) Applicant: THAT Corporation, Milford, MA (US)

(72) Inventor: Roger R. Darr, Winterville, GA (US)

(73) Assignee: THAT Corporation, Milford, MA (US)

( * ) Notice: Subject to any disclaimer, the term of this patent is extended or adjusted under 35 U.S.C. 154(b) by 583 days.

(21) Appl. No.: 18/058,292

(22) Filed: Nov. 23, 2022

(65) Prior Publication Data

US 2023/0171545 A1 Jun. 1, 2023

Related U.S. Application Data

(60) Provisional application No. 63/283,678, filed on Nov. 29, 2021.

(51) Int. Cl.
*H04R 3/04* (2006.01)

(52) U.S. Cl.
CPC .......... *H04R 3/04* (2013.01); *H04R 2430/01* (2013.01); *H04R 2430/03* (2013.01)

(58) Field of Classification Search
CPC ...... H04R 3/007; H04R 3/04; H04R 2430/03; H04R 2430/01; H03G 5/165; H03F 3/183; H03F 3/211
See application file for complete search history.

(56) References Cited

U.S. PATENT DOCUMENTS

| | | | | |
|---|---|---|---|---|
| 5,937,074 A * | 8/1999 | Carver | H04R 1/227 381/386 |
| 2011/0280407 A1* | 11/2011 | Skinner | H04R 3/04 381/99 |
| 2012/0099733 A1* | 4/2012 | Wang | H04S 1/002 381/17 |
| 2013/0077795 A1* | 3/2013 | Risbo | H04R 3/007 381/55 |

(Continued)

FOREIGN PATENT DOCUMENTS

CN 113170253 A 7/2021

OTHER PUBLICATIONS

Australian Examination Report dated Dec. 24, 2024, for Australian Patent Application No. 2022398236; Response filed Feb. 20, 2025; 8 pages.

(Continued)

*Primary Examiner* — Oyesola C Ojo
(74) *Attorney, Agent, or Firm* — DALY, CROWLEY, MOFFORD & DURKEE, LLP

(57) ABSTRACT

An aspect of the present disclosure is directed to systems, methods, and software products that enhance the sound and perception of bass energy in loudspeaker systems which have limited response in the low frequency spectrum. The systems, methods, and software products provide for (i) receiving one or more bass sub-bands of audio channel content, wherein each bass sub-band is separated from an audio program content spectrum including high-band (Continued)

energy; (ii) applying boost to each bass sub-band to compensate for rolloff of the speaker system; (iii) applying a limiter to prevent speaker saturation at low frequencies and/or high volume levels; and (iv) combining each bass sub-band along with the high band energy for sending as a recombined audio signal to the speaker system for rendition as physical sound.

25 Claims, 4 Drawing Sheets

(56) References Cited

U.S. PATENT DOCUMENTS

2015/0154966 A1* 6/2015 Bharitkar .............. G10L 19/008
381/23
2018/0114536 A1* 4/2018 Cassidy ............... H03G 3/3005
2019/0098407 A1* 3/2019 Faller ........................ H04R 3/04
2019/0305742 A1* 10/2019 Brault .................... H04N 5/607
2022/0360926 A1* 11/2022 Brännmark .......... H04R 29/001

OTHER PUBLICATIONS

Response to Taiwanese Office Action dated Dec. 14, 2023; Response filed May 27, 2024; 12 pages w/English translation.
PCT International Search Report and Written Opinion dated Mar. 9, 2023 for International Application No. PCT/US2022/050830; 13 pages.
Australian Examination Report No. 1 dated Dec. 24, 2024, for Australian Application No. 2022398236; 4 pages.
Australian Notice of Acceptance (with Allowed Claims) dated Mar. 19, 2025 for Australian Application No. 2022398236; 9 Pages.
Taiwan Office Action (w/English translation provided by Google Translate) dated Dec. 14, 2023, for ROC Taiwan Patent Application No. 111144762; 14 pages.
Taiwanese Office Action dated Oct. 22, 2024, for Taiwan Patent Application No. 111144762; 6 pages w/Google machine English translation.

* cited by examiner

SCALED RESIDUAL FUNDAMENTAL BASS ENHANCEMENT

REFERENCE TO RELATED APPLICATION

This application claims priority to and benefit of U.S. Provisional Patent Application No. 63/283,678, entitled "Scaled Residual Fundamental Bass Enhancement," filed Nov. 29, 2021, the entire content of which application is incorporated herein by reference.

BACKGROUND

Sound systems such as those included with televisions or home audio systems typically include multiple audio speakers, though in some instances such audio systems can have a single speaker. Whatever the number of speakers employed, the lower sound frequencies produced by such audio systems are influenced by the physical size of the speaker(s) and may be limited by the size of the largest speaker(s).

SUMMARY

Aspects of the present disclosure are directed to systems, methods, and software products that enhance the sound and perception of bass energy in loudspeaker systems which have limited response in the low frequency spectrum.

An aspect of the present disclosure includes a system for providing a given audio system, having a speaker system with one or more speakers, with bass enhancement for audio program content. The system may include a memory including computer-executable instructions; and a processor that is coupled to the memory and operative to execute the computer-executable instructions. The computer-executable instructions can cause the processor to: receive one or more bass sub-bands of audio channel content, where each lower-frequency sub-band is separated (out) from an audio program content spectrum including high-band energy; apply boost to each bass sub-band to compensate for rolloff of the loudspeaker system; apply a limiter to prevent speaker saturation at low frequencies and/or high volume levels; and combine each bass sub-band along with the high-band energy to form a recombined audio signal for sending to one or more speakers of the audio system for rendition as physical sound.

Implementations may include one or more of the following features. The system may provide linear boost. The processor may be configured to apply the linear boost to each sub-band before application of the limiter. The processor can be configured to apply the boost to each bass sub-band based on an expected rolloff of the loudspeaker system at a center frequency of the sub-band, respectively. The limiter may include a soft limiter. The soft limiter may implement a polynomial having a continuous first derivative. The limiter may include a hard limiter. The processor can be further configured to implement a plurality of filters to separate audio channel content into the one or more bass sub-bands and a high frequency band. The plurality of filters may include EQ filters. The EQ filters may include Linkwitz-Riley filters. Other suitable filters, including but not limited to, Butterworth, Chebyshev, elliptic (Cauer), Bessel, Gaussian, and/or Optimum "L" (Legendre-Papoulis) filters may be used in alternate embodiments.

An aspect of the present disclosure includes a method for providing scaled residual fundamental base enhancement to audio channel content used for sound production by a speaker system having one or more speakers. The method may include receiving one or more bass sub-bands of audio channel content, where each bass sub-band can be separated (out) from an audio program content spectrum including high-band energy; applying boost to each bass sub-band to compensate for rolloff of the speaker system, applying a limiter to prevent speaker saturation at low frequencies and/or high volume levels, and combining each bass sub-band along with the high band energy for sending as a recombined audio signal to the speaker system for rendition as physical sound.

Implementations may include one or more of the following features. Application of a limiter may include applying a soft limiter. The soft limiter may implement a polynomial function having a continuous first derivative. Applying boost may include applying linear boost to each sub-band before application of a limiter. Applying linear boost to each bass sub-band can be based on an expected rolloff of the speaker system at a center frequency of the sub-band, respectively.

Another aspect of the present disclosure includes a computer-readable non-transitory storage medium for scaled residual fundamental base enhancement for an audio system including a speaker system having one or more speakers. The computer-readable non-transitory storage medium also includes receiving one or more bass sub-bands of audio channel content, where each bass sub-band is separated from an audio program content spectrum including high-band energy; applying boost to each bass sub-band to compensate for rolloff of the speaker system, applying a limiter to prevent speaker saturation at low frequencies and/or high volume levels, and combining each bass sub-band along with the high-band energy for sending as a recombined audio signal to the speaker system for rendition as physical sound. Other embodiments of this aspect include corresponding computer systems, apparatus, and computer programs recorded on one or more computer storage devices, each configured to perform the actions of the methods.

Implementations may include one or more of the following features. The computer-readable storage medium where the computer-readable instructions may include instructions for applying a limiter may include applying a soft limiter. Computer-readable instructions may include instructions for the soft limiter implementing a polynomial function having a continuous first derivative. The computer-readable instructions may include instructions for applying linear boost to each bass sub-band before application of a limiter. The computer-readable instructions may include instructions for applying linear boost to each bass sub-band based on an expected rolloff of the speaker system at a center frequency of the sub-band, respectively. Implementations of the described techniques may include hardware, a method or process, or computer software on a computer-accessible medium.

Other embodiments of the aspects and examples described may include corresponding computer systems, apparatus, and computer programs recorded on one or more computer storage devices, each configured to perform the actions of the methods as described herein. A computer system of one or more computers can be configured to perform particular operations or actions, as described herein, by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The features and advantages described herein are not all-inclusive; many additional features and advantages will be apparent to one of ordinary skill in the art in view of the drawings, specification, and claims. Moreover, it should be noted that the language used in the specification has been selected principally for readability and instructional purposes, and not to limit in any way the scope of the present disclosure, which is susceptible of many embodiments. What follows is illustrative, but not exhaustive, of the scope of the present disclosure.

BRIEF DESCRIPTION OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principals of the concepts described herein. Like reference numerals designate corresponding parts throughout the different views. Furthermore, embodiments are illustrated by way of example and not limitation in the figures, in which.

DETAILED DESCRIPTION

The features and advantages described herein are not all-inclusive; many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The subject technology is susceptible of many embodiments. What follows is illustrative, but not exhaustive, of the scope of the subject technology.

Aspects of the present disclosure are directed to and include systems, methods, and/or software products (including software applications and computer programs) that can enhance the sound and perception of bass energy in speaker or loudspeaker systems (e.g., used in larger/more expansive audio systems) which have limited response in the low-frequency (bass) spectrum. Examples and embodiments of the present disclosure can provide for the combination of low-band (bass bass) splitting and specially-designed limiting function, e.g., use of a soft limiter or soft-limiting function e.g., having a continuous first derivative.

Examples and embodiments of the present disclosure (e.g., systems, circuits, software products and/or methods) can leave as much of the fundamental bass note energy intact as possible, which may be most or all of it at low volume levels, and additionally have the ability to linearly correct low frequency impairment at lower volume levels or when transient low volume intervals occur, e.g., during playback of program content. At higher volume settings or louder program transient intervals, a limiter (e.g., soft limiter) can be applied to the bass response in order to prevent the speaker system from entering saturation and causing uncontrolled clipping of the entire signal. The limiter can simultaneously act as a non-linear element for the creation of harmonic energy (harmonic augmentation), which can enhance the perception of missing bass (sub-harmonic) notes; though the bass energy may be present at a reduced energy level.

A band-splitting approach can provide for processing of lower-frequency (lower-band energy), which is typically more problematic for the speaker(s) of an audio system, in one or more (preferably two or more) separate low-frequency channels, where the limiting can be performed in a controlled manner. For example, with two different low-frequency processing channels (for example one below 100 Hz and another for energy between 100 Hz and 200 Hz) and two separate non-linear elements for soft limiting, undesirable intermodulation products between notes in different bands can be greatly reduced, which can commensurately decrease perceptible distortion. This can also allow for coarse equalization of one or more low-frequency bands by scaling simple filters with straightforward design parameters.

Figure 1:
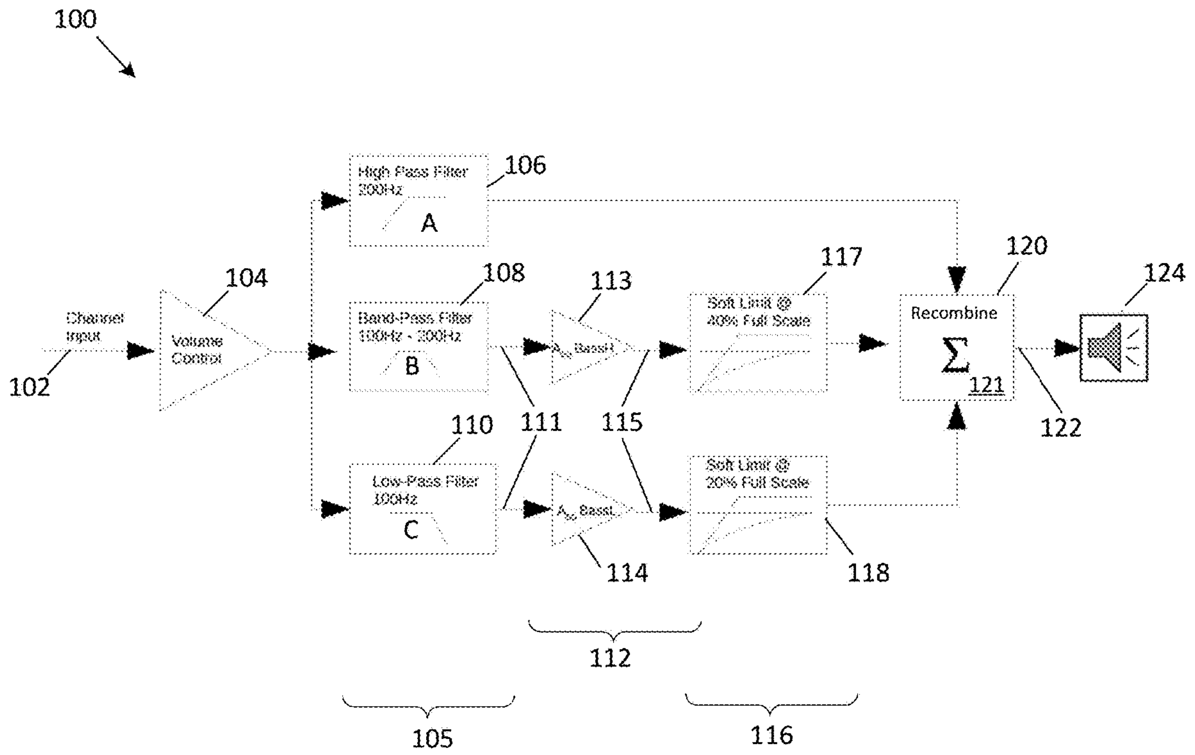
FIG. 1 is a diagram showing a signal flow according to an example process/method of scaled residual fundamental base enhancement, in accordance with the present disclosure.

FIG. 1 is a diagram showing a signal flow according to an example process/method of scaled residual fundamental base enhancement 100, in accordance with the present disclosure. As shown, a channel input (audio channel input) 102 includes audio channel content, such as received from or provided by stored or transmitted audio program/signal content. Channel input 102 may include analog or digital signals. For analog signals, an analog-to-digital (A/D) converter (not shown) may be used to convert the analog signals to digital signals. Channel input 102 may be adjusted by a volume control 104 as shown. The audio channel content can be provided to a filter section 105 having a plurality of filters, e.g., as shown by filters 106, 108, 110, for separating into respective frequency channels or sub-bands (sub-bands A-C are shown), including two or more bass sub-bands for subsequent processing. Gain or "boost" may be applied to bass sub-bands by a boost section 112, as shown. Limiting may be applied to the two or more bass sub-bands, as shown by limiting section 116 with limiters 117-118. In some examples, boost and/or limiting may be applied to the high band (e.g., shown as sub-band A). The gain values, limit points, and filter characteristics can be, and preferably are, based on speaker characteristics of the related audio speaker(s) used, e.g., speaker 124. The sub-bands can be recombined (e.g., summed), as shown by combination unit (e.g., summation block) 122, and then provided to one or more speakers 124 for production as sound.

For filter section 105, filter 106 is shown as a high-pass filter having a cutoff frequency at 200 Hz. Filter 108 is shown as a bandpass filter having a passband between 100 Hz and 200 Hz. Filter 110 is shown as a low-pass filter having a cutoff frequency of 100 Hz. A different number of filters (more or fewer) may be used in other examples and embodiments and the filter(s) may have different passband and/or cutoff frequencies. The separation provided by filter section 105 is preferably done in a way that can allow the separated channels (sub-bands) to be later re-combined (e.g., by addition) without destructive interference due to phase differences. In some embodiments and examples, equalization (EQ) style filters, including but not limited to Linkwitz-Riley filters of any suitable order (e.g., second, fourth, eighth, etc.) can be used for filters in filter section 105. High-pass filter 106 is shown having a threshold frequency of 200 Hz (of course, other thresholds may be implemented in alternate embodiments). In a multichannel version, filter 106 would separate the bands of each channel (for example left and right for stereo).

In exemplary embodiments, two lower frequency (bass) bands are preferable: (i) an octave of "high bass," such as 100 Hz to 200 Hz, or 75 Hz to 150 Hz, as shown by band-pass filter 108; and, (ii) a "low bass" sub-band covering from zero (or other lower limit) to the lower edge of the high bass band, as shown by low-pass filter block 110; though other embodiments can utilize a different number of sub-bands for bass processing. Other suitable filters, including but not limited to, Butterworth, Chebyshev, elliptic (Cauer), Bessel, Gaussian, and/or Optimum "L" (Legendre-Papoulis) filters may be used in alternate embodiments. In a multichannel implementation, e.g., stereo audio, the band separation filters 108 and 110 could function with a single left+right (L+R) input instead of a mono input. The L+R input can be derived from the stereo left (L) and right (R) inputs.

Gain or "boost" may be applied to bass sub-bands by a boost section 112, as shown. In exemplary embodiments, the gain or boost may be linear. Gain blocks 113, 114 (labeled "$A_{EQ}$ BassH" and "$A_{EQ}$ BassL") are shown as providing such linear boost. In some applications and embodiments, it may be preferable that linear boost is applied before, not after, limiting. In the basic or simplest case, the expected rolloff of the loudspeaker system at the center of each low frequency band separated, e.g., as described above, can be applied as a gain to that sub-band to compensate. At low volume levels, the linear boost can dominate and correctly equalize the speaker system.

For per-band limiting, limiting section 116 may include one or more soft limiters (e.g., soft limiters 117-118), which may be used to prevent speaker saturation at low frequencies and high-volume levels. The amplitude limit is preferably be determined relative to the absolute signal level that is seen by the loudspeaker. Therefore, if the signal is to be pre-processed at source levels before volume control (e.g., volume control is positioned after processing) information about the volume setting is preferably available and used in order to correctly set limiter thresholds. In this scenario, a higher volume setting could require a lower limiter threshold relative to full scale, and a lower volume setting allows a proportionally higher limiter threshold to be set. In exemplary embodiments, a soft limiter implementing a polynomial having a continuous first derivative may be used, e.g., as described below for EQ. 1.

The amplitude limit of each sub-band may be set separately based on the saturation characteristics of the speaker at the lower side of the associated band. Typically, the lower frequency band (e.g., sub-band C provided by filer 110) will have a significantly lower amplitude limit threshold than the "high bass" band (e.g., sub-band B provided by filter 108), however the high bass band may be limited as well for optimal performance. The soft limiter function is preferably applied independently for each band before summing, rather than after, to reduce intermodulation distortion and enhance the magnitude and regularity of harmonics produced for each note, which decreases the perception of distortion and increases perception of independent bass notes. In some applications, e.g., for the situation shown in FIG. 1, the lower sub-bands may have both a higher level of linear boost and a lower limit threshold. In situations of louder volume, such a configuration can push more of the louder program content into harmonic energy. This can be a desirable effect of the processing since it prevents speaker saturation while enhancing the harmonic pattern and preserving only as much of the fundamental energy as will be well tolerated by the loudspeaker system.

In alternate examples, instead of (or in addition to) use of a soft limiter, limiting may be implemented by a hard limiter for the creation of a stronger or different harmonic pattern while limiting fundamental energy; in some examples, such a non-linearity may be implemented simply with saturation arithmetic. For such alternative implementations, it may be advisable to add low-pass or other spectral-shaping filters after the limiter(s), to remove (or facilitate reduction of) higher-frequency strong harmonics, but before summation with non-limited high band energy. Harmonic shaping can also be used with soft limiters, particularly in the case when limiter thresholds are set very low relative to expected low-frequency (e.g., bass) input.

The separated and processed bands can be re-combined (shown at 120), along with the high band energy (e.g., as shown by summation block 121) and sent as a summed or recombined signal 122, preferably as immediately as possible, to the speaker(s) 124 for rendition as physical sound. In some examples, the bass enhancement is preferably applied as late as possible, e.g., after any other processing that may be needed, in order to have the best possible level information in the lower bands, since the limiter thresholds are intended to be relative to the actual speaker energy levels.

While FIG. 1 shows volume control 104 before bass enhancement processing, other embodiments/examples can position the volume control 104 after filtering/processing. It should be noted that since the limiter points are intended to be relative to speaker saturation levels at corresponding frequencies, placing volume control as shown can simplify operation in most cases. If volume control 104 is placed downstream (before speaker 124 in the signal flow), limiter levels may need to be adjusted to compensate for volume adjustments, e.g., as described in per-band soft limiting, below.

Soft Limiter Design and Polynomial—Exemplary Embodiments:

In exemplary embodiments, a soft limiter may be used that has an input to output slope of 1:1 at 0.5 input (i.e., relative to a full-scale digital signal of 1.0 in this case), and smoothly levels off to a slope of zero at an output of 1.0, corresponding to an input of 1.366. Below 0.5, the input can be passed without alteration. Above 1.366, the value of 1.0 can be substituted. In the range of 0.5 to 1.366, a polynomial smoothing function (e.g., as provided by EQ. 1, below) can be applied to smooth the transition region. This design approach can avoid all (or substantially all) distortion of lower amplitude signals while minimizing clipping distortion of louder signals by maintaining a continuous first derivative during the transition to limited output. In some examples, to allow for a fixed gain boost and a continuous first derivative, it may be preferable to utilize extra precision (e.g., overhead bits relative to a full-scale signal) at the limiter input. The limiting function can restore the output to the proper level relative to full scale (1.0 in this case).

Since, in the example described above, the limiter math is designed at a fixed transition region of 0.5 to 1.0, the input should be counter-scaled to place the limit at the desired level. For example, if the desired output limit is 0.5, then the transition region would need to be 0.25 to 0.5 (output), so the signal input would be simply multiplied by 2 before the limiter math and divided back down by 2 after the limiter math.

For exemplary embodiments, the following limiter equation for the transition region can be used:

$$y=ax-b(x^3)+c, \text{ where } a=1.1547,\ b=0.206267, \text{ and } c=-0.05157 \quad \text{(EQ. 1)}$$

Sample Limiter Code (MATLAB format):

```
% Lowest, L1 band, will be limited to 1/5 scale.
lpr1 = lpr1 * (L1Gain * 5) ;
a = 1.1547 ; b=.206267 ; c=-0.05157 ;
for i=1:length(lpr1)
  if (lpr1(i) > 1.366 )
    lpr1(i) = 1.0 ;
  elseif (lpr1(i) < -1.366)
    lpr1(i) = -1.0 ;
  elseif (lpr1(i) > 0.5)
    lpr1(i) = a * lpr1(i) - (b * lpr1(i)^3) + c ;
  elseif (lpr1(i) < -0.5)
    lpr1(i) = 0 - c - (a * abs(lpr1(i))) + (b * abs(lpr1(i))^3 ) ;
  end
end
lpr1 = lpr1 / 5 ; % Remove limiter point scaling.
```

The foregoing description is for preferred examples; other soft-limiter designs (e.g., polynomial functions, or other equations or limiter math, and/or code) may be used within the scope of the present disclosure.

Figure 2:
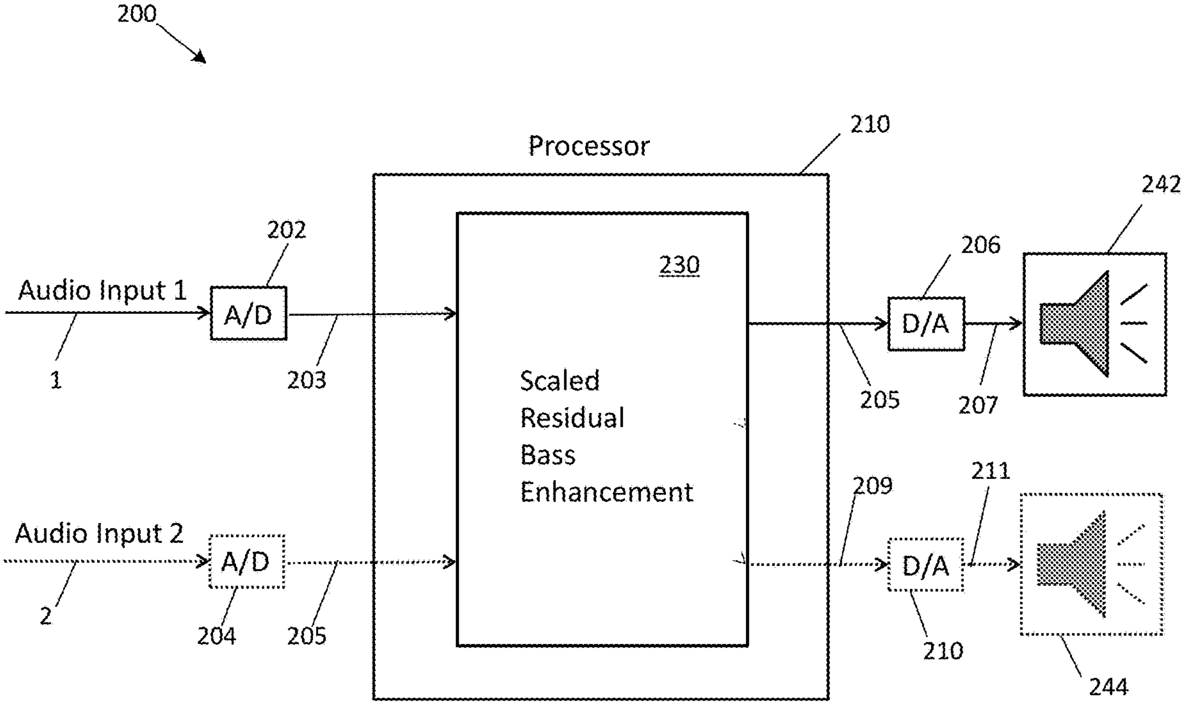
FIG. 2 is a diagram of example processing hardware for scaled residual fundamental base enhancement, in accordance with the present disclosure.

FIG. 2 is a diagram of example processing hardware (a.k.a., system or circuit with a processor and software code) 200 for scaled residual fundamental bass enhancement, in accordance with the present disclosure. As indicated, system 200 can provide either (or both) of a one-channel implementation (solid lines) and a two-channel implementation (solid lines and dashed lines). Audio Inputs 1 and 2 are shown. Either input (e.g., Audio Input 1) individually can correspond to a mono input while Audio Input 1 combined with Audio Input 2 corresponds to a stereo (L and R) input.

The analog audio inputs 1, 2 are converted to digital by an analog-to-digital converters (A/D) 202, 204, respectively, producing outputs 203, 205. The digital audio samples of outputs 203, 205 are then passed to the processor 210, which is configured (e.g., programmed) to implement scaled residual bass enhancement 230 processing. The processor 210 can be or include any type of suitable computational unit such as, e.g., a digital signal processor (DSP), microcontroller unit (MCU), system on a chip (SoC), etc. Additionally, some processors may have the A/D integrated directly into the chip. In another system, the audio content could already be digitized and encoded (way, mp3 etc.) and be decoded by the processor or decoded externally and passed directly to the processor via an appropriate digital interface. The bass enhancement functionality, in this example, would be implemented in software (shown by 230) running on the processor. In a mono (single-channel) implementation, the bass enhancement functionality would be similar to or the same as shown in FIG. 1.

In the stereo (two-channel) implementation, the high pass filter (e.g., as shown by 106 in FIG. 1) would filter both L and R independently. The band pass filter (e.g., as shown by 108 in FIG. 1) and low pass filter (e.g., as shown by 110 in FIG. 1) would filter the sum of L and R (L+R). In the mono case the output of the summation (120 in FIG. 1) is passed to a digital-to-analog converter (D/A) 206 which then drives speaker 242. In the stereo case the processed L+R signal is summed with L and R independently and each channel is passed to the respective D/A 206, 210 for providing to speaker 242, 244. Some processors may have the D/A converter integrated directly into the corresponding chip. The system design shown can be expanded for multichannel systems such as 2.1 (left, right, and subwoofer) audio inputs, 5.1, and/or 7.1 audio inputs. In such cases, there may be a mixture of multiple implementations of the bass enhancement function. For an example of 2.1 audio inputs, the left and right inputs may be processed as a stereo input as previously described and the subwoofer (low frequency) input could be processed separately as a mono input. Examples can implement 5.1 and 7.1 audio inputs and can operate similarly.

Figure 3:
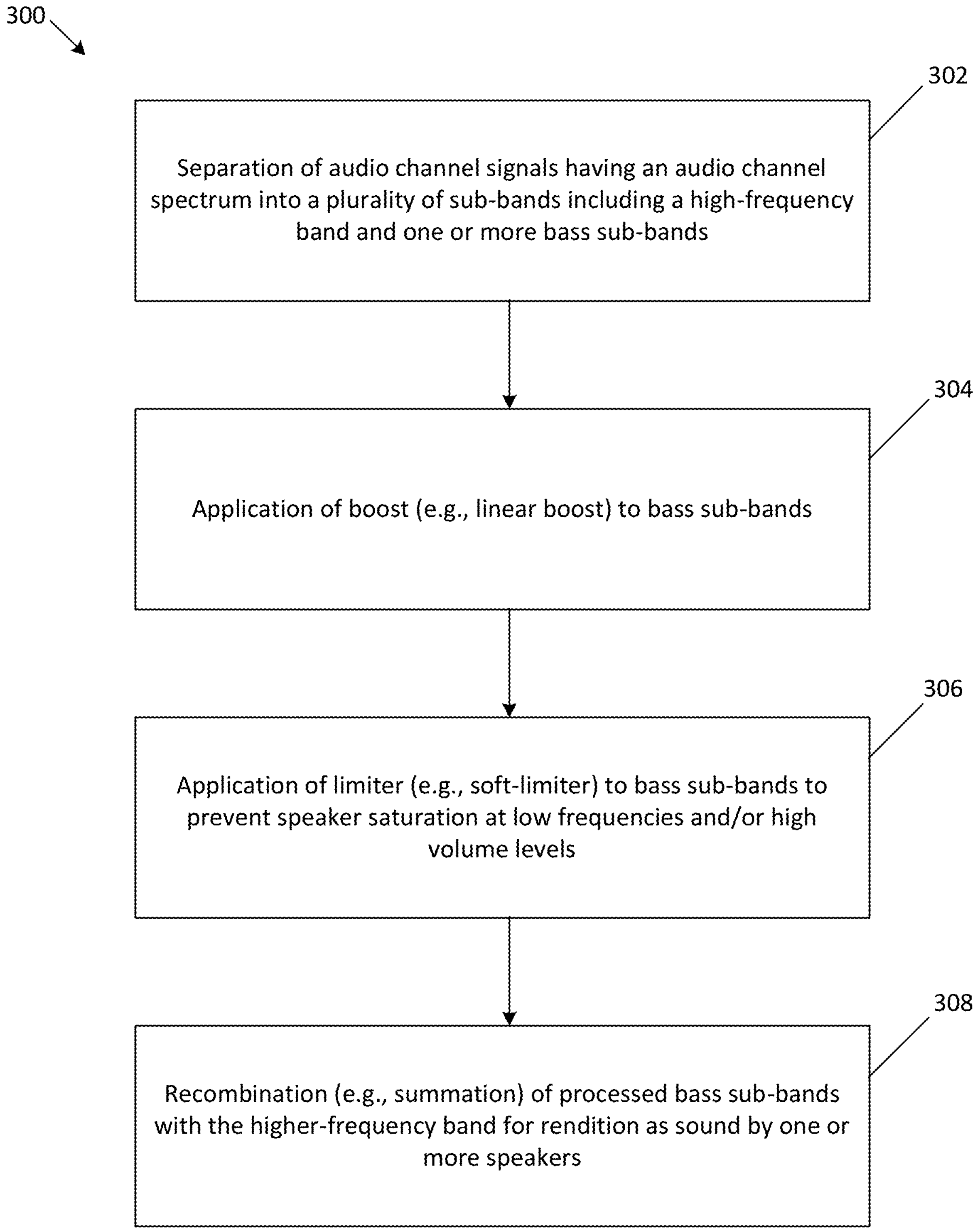
FIG. 3 is a box diagram of an example method of scaled residual fundamental base enhancement, in accordance with the present disclosure.

FIG. 3 is a diagram of an example method 300 of scaled residual fundamental bass enhancement, in accordance with the present disclosure. Method 300 can include a step of separation, for an audio channel (e.g., L or R), of audio channel signals having an audio channel spectrum into multiple (a plurality of) sub-bands including a high-frequency band and one or more bass sub-bands, as shown at 302. Method 300 can include a step of application of boost (e.g., linear boost) to bass sub-bands, as shown at 304. Method 300 can include a step of application of a limiter (e.g., soft-limiter) to bass sub-bands to prevent speaker saturation at low frequencies and (relatively) high volume levels, as shown at 306. Method 300 can include a step of recombination (e.g., summation) of processed bass sub-bands with a higher frequency band for rendition as sound by one or more speakers, as shown at 308.

Figure 4:
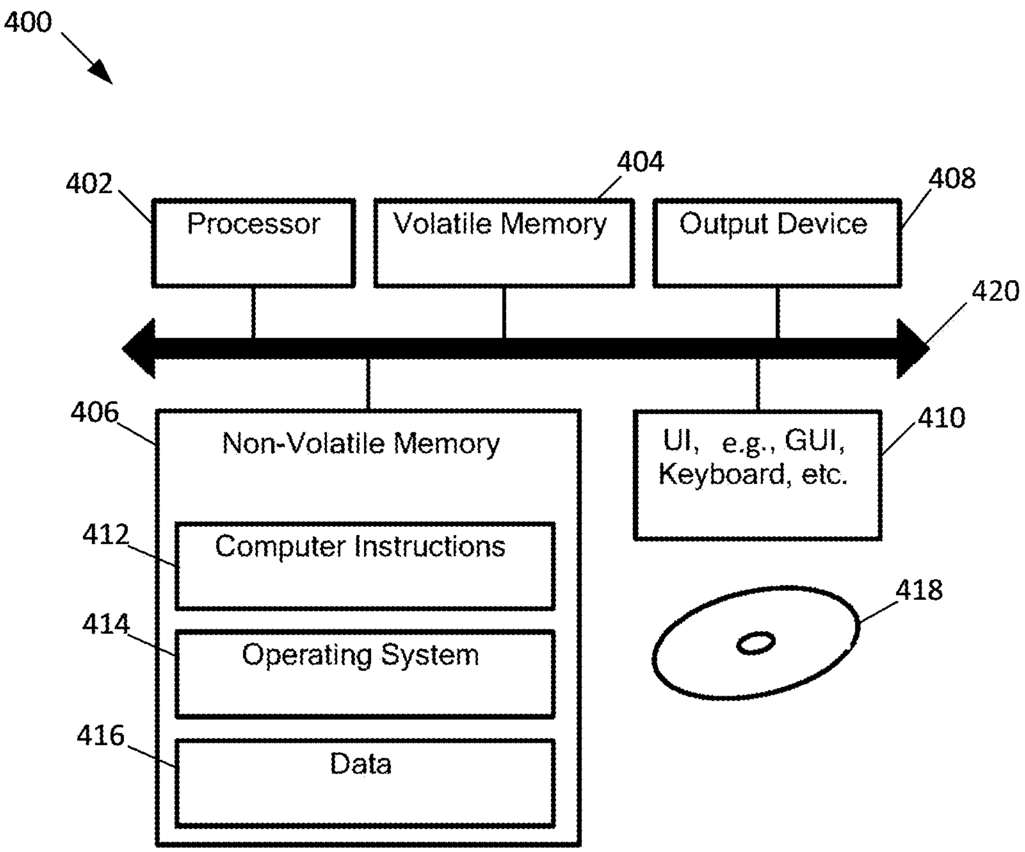
FIG. 4 is a schematic diagram of an example computer system that can perform all or at least a portion of the processing, e.g., steps in the algorithms and methods, including code, described herein.

FIG. 4 is a schematic diagram of an example computer system 400 that can perform all or at least a portion of the processing, e.g., steps in the algorithms and methods, including code or pseudocode, described herein. The computer system 400 includes one or more processors 402, a volatile memory 404, a non-volatile memory 406 (e.g., hard disk), an output device 408 and a user input or interface (UI) 410, e.g., graphical user interface (GUI), a mouse, a keyboard, a display, and/or any common user interface, etc., as well as one or more audio channel inputs, e.g., having left "L" and right "R" channel signals (according to any of various well known audio signal formats). The non-volatile memory (non-transitory storage medium) 406 stores computer instructions 412 (a.k.a., machine-readable instructions or computer-readable instructions) such as software (computer program product), an operating system 414 and data 416. In one example, the computer instructions 412 are executed by the processor 402 out of (from) volatile memory 404. In one embodiment, an article 418 (e.g., a storage device or medium such as a hard disk, an optical disc, magnetic storage tape, optical storage tape, flash drive, etc.) includes or stores the non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), and optionally at least one input device, and one or more output devices. Program code may be applied to data entered using an input device or input connection (e.g., port or bus) to perform processing and to generate output information.

The system 400 can perform processing, at least in part, via a computer program product, (e.g., in a machine-readable storage device), for execution by, or to control the operation of, data processing apparatus (e.g., a programmable processor, a computer, or multiple computers). Each such program may be implemented in a high-level procedural or object-oriented programming language to communicate with a computer system. The programs, however, may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Accordingly, embodiments of the inventive subject matter can afford various and numerous benefits relative to prior art techniques.

Various embodiments of the concepts, systems, devices, structures, and techniques sought to be protected are described above with reference to the related drawings. Alternative embodiments can be devised without departing from the scope of the concepts, systems, devices, structures, and techniques described. For example, while elements/steps of methods and/or components of circuits are described herein generally in the context of digital circuits, other examples of the present disclosure could also be implemented in analog circuitry, as a person of ordinary skill in the art would understand.

It is noted that various connections and positional relationships (e.g., over, below, adjacent, etc.) may be used to describe elements in the description and drawing. These connections and/or positional relationships, unless specified otherwise, can be direct or indirect, and the described concepts, systems, devices, structures, and techniques are not intended to be limiting in this respect. Accordingly, a coupling of entities can refer to either a direct or an indirect coupling, and a positional relationship between entities can be a direct or indirect positional relationship.

As an example of an indirect positional relationship, positioning element "A" over element "B" can include situations in which one or more intermediate elements (e.g., element "C") is between elements "A" and elements "B" as long as the relevant characteristics and functionalities of elements "A" and "B" are not substantially changed by the intermediate element(s).

Also, the following definitions and abbreviations are to be used for the interpretation of the claims and the specification. The terms "comprise," "comprises," "comprising," "include," "includes," "including," "has," "having," "contains" or "containing," or any other variation are intended to cover a non-exclusive inclusion. For example, an apparatus, a method, a composition, a mixture, or an article, that comprises a list of elements is not necessarily limited to only those elements but can include other elements not expressly listed or inherent to such apparatus, method, composition, mixture, or article.

Additionally, the term "exemplary" is means "serving as an example, instance, or illustration. Any embodiment or design described as "exemplary" is not necessarily to be construed as preferred or advantageous over other embodiments or designs. The terms "one or more" and "at least one" indicate any integer number greater than or equal to one, i.e., one, two, three, four, etc. The term "plurality" indicates any integer number greater than one. The term "connection" can include an indirect "connection" and a direct "connection".

References in the specification to "embodiments," "one embodiment, "an embodiment," "an example embodiment," "an example," "an instance," "an aspect," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it may affect such feature, structure, or characteristic in other embodiments whether explicitly described or not.

Relative or positional terms including, but not limited to, the terms "upper," "lower," "right," "left," "vertical," "horizontal, "top," "bottom," and derivatives of those terms relate to the described structures and methods as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements.

Use of ordinal terms such as "first," "second," "third," etc., in the claims to modify a claim element does not by itself connote any priority, precedence, or order of one claim element over another, or a temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within plus or minus (±) 10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

The disclosed subject matter is not limited in its application to the details of construction and to the arrangements of the components set forth in the following description or illustrated in the drawings. The disclosed subject matter is capable of other embodiments and of being practiced and carried out in various ways.

Also, the phraseology and terminology used in this patent are for the purpose of description and should not be regarded as limiting. As such, the conception upon which this disclosure is based may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, the present disclosure has been made only by way of example. Thus, numerous changes in the details of implementation of the disclosed subject matter may be made without departing from the spirit and scope of the disclosed subject matter.

Accordingly, the scope of this patent should not be limited to the described implementations but rather should be limited only by the spirit and scope of the following claims.

All publications and references cited in this patent are expressly incorporated by reference in their entirety.

What is claimed is:

1. A system for providing a given audio system with bass enhancement for audio program content, wherein the audio system includes a loudspeaker system having one or more speakers, the system comprising:

a memory comprising computer-executable instructions; and a processor coupled to the memory and operative to execute the computer-executable instructions, the computer-executable instructions causing the processor to:

a. receive a plurality of bass sub-bands of audio channel content, wherein each lower-frequency sub-band is separated from an audio program content spectrum including high-band energy;

b. apply a fixed boost to each bass sub-band to compensate for rolloff of the loudspeaker system;

c. apply a limiter to each sub-band in order to prevent speaker saturation at low frequencies and/or high volume levels, wherein the limiter generates minimal harmonic distortion at low input levels and stronger harmonic distortion at higher input levels;

d. apply harmonic shaping filtration wider than the original sub-bands to the limiter outputs to allow and/or emphasize harmonic energy outside the original sub-bands; and e. combine each bass sub-band plus harmonic energy along with the high-band energy to form a recombined audio signal for sending to one or more speakers of the audio system for rendition as physical sound.

2. The system of claim 1, wherein the boost comprises linear boost to each bass sub-band before application of the limiter.

3. The system of claim 2, wherein the processor is configured to apply the boost to each bass sub-band based on an expected rolloff of the loudspeaker system at a center frequency of the sub-band, respectively.

4. The system of claim 1, wherein the limiter comprises a soft limiter.

5. The system of claim 4, wherein the soft limiter implements a polynomial having a continuous first derivative.

6. The system of claim 1, wherein the limiter comprises a hard limiter.

7. The system of claim 1, wherein the processor is further configured to implement a plurality of filters to separate audio channel content into the one or more bass sub-bands and a high frequency band.

8. The system of claim 7, wherein the plurality of filters comprises EQ filters.

9. The system of claim 8, wherein the EQ filters comprise Linkwitz-Riley filters.

10. A method for providing scaled residual fundamental base enhancement to audio channel content used for sound production by a speaker system, the method comprising:

a. receiving a plurality of bass sub-bands of audio channel content, wherein each bass sub-band is separated from an audio program content spectrum including high-band energy;

b. applying a fixed boost to each bass sub-band to compensate for rolloff of the speaker system;

c. applying a limiter to each sub-hand in order to prevent speaker saturation at low frequencies and/or high volume levels, wherein the limiter generates minimal harmonic distortion at low input levels and stronger harmonic distortion at higher input levels;

d. applying harmonic shaping filtration wider than the original sub-bands to the limiter outputs to allow and/or emphasize harmonic energy outside the original sub-bands; and e. combining each bass sub-band plus harmonic energy along with the high band energy for sending as a recombined audio signal to the speaker system for rendition as physical sound.

11. The method of claim 10, wherein applying a limiter comprises applying a soft limiter.

12. The method of claim 11, wherein the soft limiter implements a polynomial function having a continuous first derivative.

13. The method of claim 10, wherein applying boost comprises applying linear boost to each sub-band before application of a limiter.

14. The method of claim 13, wherein applying linear boost to each bass sub-band is based on an expected rolloff of the speaker system at a center frequency of the sub-band, respectively.

15. A computer-readable non-transitory storage medium for scaled residual fundamental base enhancement for an audio system including a speaker system, the storage medium including computer-readable instructions for:

a. receiving a plurality of bass sub-bands of audio channel content, wherein each bass sub-band is separated from an audio program content spectrum including high-band energy;

b. applying a fixed boost to each bass sub-band to compensate for rolloff of the speaker system;

c. applying a limiter to prevent speaker saturation at low frequencies and/or high volume levels, wherein the limiter generates minimal harmonic distortion at low input levels and stronger harmonic distortion at higher input levels;

d. applying harmonic shaping filtration wider than the original sub-bands to the limiter outputs to allow and/or emphasize harmonic energy outside the original sub-bands; and e. combining each bass sub-band plus harmonic energy along with the high-band energy for sending as a recombined audio signal to the speaker system for rendition as physical sound.

16. The computer-readable storage medium of claim 15, wherein the computer-readable instructions comprise instructions for applying a limiter comprises applying a soft limiter.

17. The computer-readable storage medium of claim 16, wherein computer-readable instructions comprise instructions for the soft limiter implementing a polynomial function having a continuous first derivative.

18. The computer-readable storage medium of claim 16, wherein the computer-readable instructions comprise instructions for applying linear boost to each bass sub-band before application of a limiter.

19. The computer-readable storage medium of claim 18, wherein the computer-readable instructions comprise instructions for applying linear boost to each bass sub-band based on an expected rolloff of the speaker system at a center frequency of the sub-band, respectively.

20. The system of claim 1, wherein the processor is further configured to implement an output volume control function after the signals are combined.

21. The system of claim 20, wherein the limiter thresholds are adjusted independently as a function of the output volume control setting.

22. The method of claim 10, further including applying an output volume control function after the signals are combined.

23. The method of claim 22, wherein the limiter thresholds are adjusted independently as a function of the output volume control setting.

24. The computer-readable storage medium of claim 15, wherein the computer-readable instructions comprise instructions for applying an output volume control after the signals are combined.

25. The computer-readable storage medium of claim 24, wherein the computer-readable instructions comprise instructions for adjusting the limiter thresholds independently as a function of the output volume control setting.

* * * * *